Oct. 6, 1953            G. A. GAUM            2,654,619
REDUCING ELBOW
Filed April 11, 1951
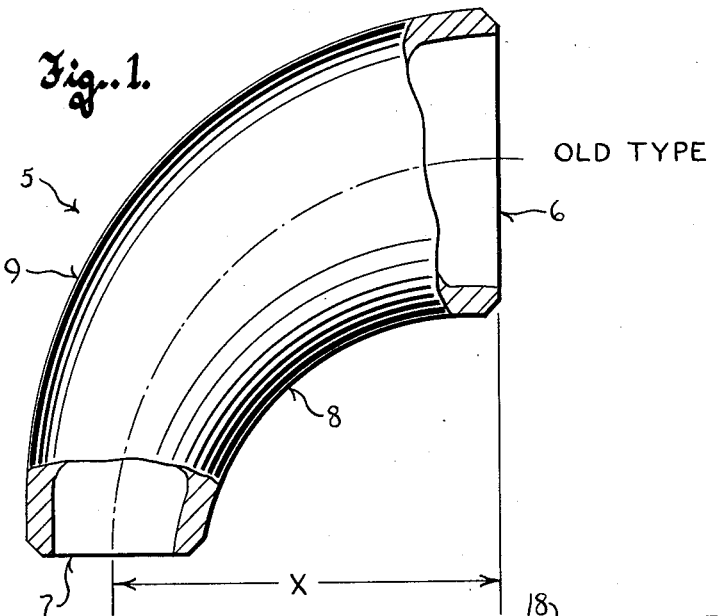
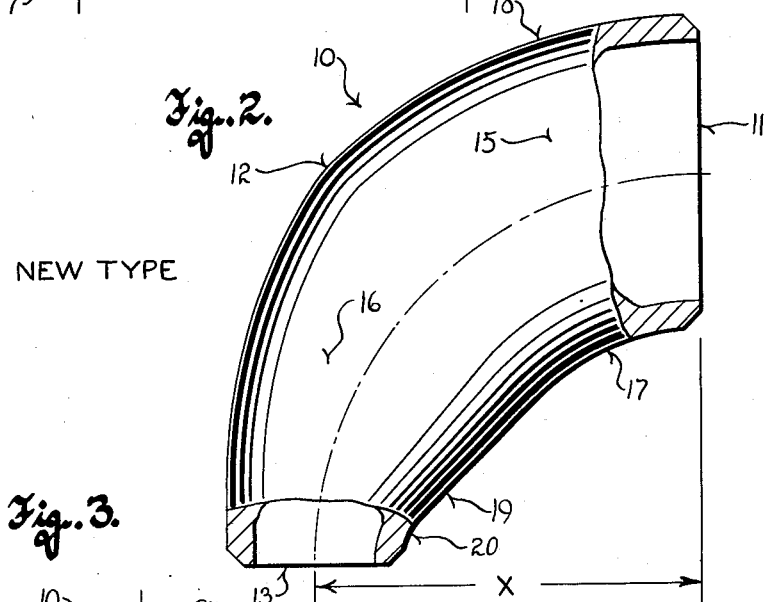
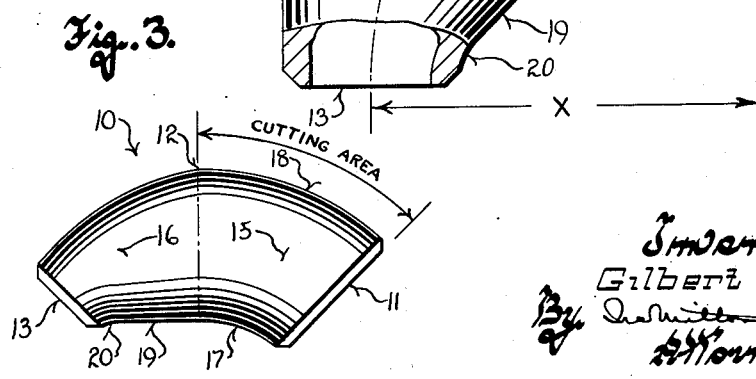
Inventor
Gilbert A. Gaum Patented Oct. 6, 1953

2,654,619

UNITED STATES PATENT OFFICE 2,654,619

REDUCING ELBOW

Gilbert A. Gaum, Louisville, Ky., assignor to Ladish Co., Cudahy, Wis., a corporation of Wisconsin Application April 11, 1951, Serial No. 220,409

1 Claim. (Cl. 285—198)

This invention relates to pipe fittings and refers more particularly to seamless reducing elbows or L's adapted to be butt welded to the adjacent ends of two pieces of pipe or tubing of different diameters. The fitting contemplated by this invention thus combines the functions of an elbow and a reducer.

The broad concept of a reducing elbow is in itself not new but heretofore reducing elbows suitable for butt welded connection to steel pipe and tubing have been tapered for their full arcuate length and thus could not be cut to accommodate angles other than the nominal angle of the fitting since any reduction of the angular length of the fitting of necessity would be accompanied by a change in diameter of at least one end of the shortened fitting.

Recognizing this deficiency of reducing elbows heretofore available it is an object of this invention to provide a seamless reducing elbow especially adapted for butt welded connection to the pipes or tubes which it is to connect, which elbow may be cut transversely to its axial center line to provide an elbow of any desired angle lying between the nominal angle of the elbow and substantially one-half thereof without involving changing the diameter of the fitting at either end thereof.

As a specific example, it is an object of this invention to provide a 90° reducing elbow normally adapted to connect two pieces of pipe or tubing of different diameters with their axes disposed at 90° to one another, but which elbow, by a single cutting operation, may be adapted to connect pipes or tubes of the same two sizes with their axes disposed at any angle to one another from 45° to 90°.

Another object of this invention resides in the provision of a reducing elbow or L which may be produced by a simple and expeditious method and with relatively simple apparatus. The apparatus forms the subject matter of a copending application of Gilbert A. Gaum, Serial No. 220,410 filed April 11, 1951, and therefore is not herein described.

A further object of this invention resides in the provision of a reducing elbow or L of the character described which will have superior strength by reason of the fact that internal stresses are fairly uniformly distributed in it during its production.

With the above and other objects in view, which will appear as the description proceeds, this invention resides in the novel construction substantially as hereinafter described and more particularly defined by the appended claim, it being understood that such changes in the precise embodiment of the herein disclosed invention may be made as come within the scope of the claim.

The accompanying drawing illustrates one complete example of the physical embodiment of the invention constructed according to the best mode so far devised for the practical application of the principles thereof, and in which:

Figure 1 is a side elevational view of a reducing elbow of the type heretofore generally used, portions being cut away to show details;

Figure 2 is a view similar to Figure 1 but showing the reducing elbow of this invention; and Figure 3 is a side elevational view of a 90° reducing elbow of this invention showing how the same may be cut to provide an elbow of an angle less than 90°.

Referring now more particularly to the accompanying drawing, the numeral 5 designates generally a 90° reducing elbow of the type which has heretofore been in general use for butt welded connection to steel pipe or tubing. The large diameter end 6 of the elbow and the small diameter end 7 thereof are each adapted to be butt welded to pipes or tubes (not shown) having diameters and wall thicknesses substantially equal to those of the elbow at the respective ends thereof to which said pipes or tubes are joined. The two pieces of pipe or tubing so connected will of course have their axes disposed at 90° to one another, and as is customary both ends of the elbow are chamfered to facilitate welding.

It will be observed that the contours of the inside radius 8 of the elbow 5 and the outside radius 9 thereof are defined by arcs which are substantially segments of a pair of non-concentric circles so that the elbow is taperingly reduced throughout its entire length from its large diameter end 6 to its small diameter end 7. Thus if any portion of the elbow 5 were cut away, in an attempt to reduce the angle thereof, the newly cut end of the elbow would no longer have the same diameter as the pipe or tube to which it was to be connected, and a butt welded joint would be virtually out of the question.

Referring now to Figure 2, the elbow of this invention, designated generally by 10, is untapered through substantially half its arcuate length, from its large diameter end 11 to a point 12 about midway between its ends. The entire taper of the elbow of this invention is thus confined to a 45° length thereof extending from the small diameter end 13 of the elbow substantially to the point 12 half way along the arc of its curvature.

Thus the elbow of this invention may be considered as comprising two integral portions, each curved through an angle of 45°. One of these portions 15 extends outwardly from the midpoint 12 of the elbow and has a uniform cross-sectional diameter throughout its arcuate length. The other portion 16 contains the entire reduction of the elbow and tapers from a cross-sectional diameter equal to that of the portion 15 to that of the small diameter end 13.

The cross-sectional diameter of the large diameter end 11 is maintained throughout substantially half the angle of the elbow, i. e. for the portion 15, by reason of the fact that the inner and outer curves 17 and 18, respectively of the untapered portion comprise concentric circular arcs. Consequently a cut through this untapered uniform diameter portion 15, which is indicated as the cutting area in Figure 3, made on a plane at right angles to its longitudinal centerline (i. e., a plane defined by a radius line concentric with its inner and outer radii) will expose a new large diameter end which will be perfectly circular and will have the same diameter as the original large diameter end 11, so that any pipe or tube which could be welded to the large diameter end of the uncut elbow can equally well be welded to any new end produced by such a cut through the untapered portion. Since this cut can be made anywhere within the cutting area, the angular reduction obtained thereby can be anything between 45° and 90°.

In order to conform to the prescribed standards set for reducing elbows the center-to-face dimension, i. e. from the face of the large diameter end to the center of the small diameter end, indicated as X in Figures 1 and 2, must be maintained even though the entire taper of the elbow is confined to substantially one-half the angle defined by the elbow. To meet this requirement the contour of the portion of the reducing elbow radially outward of its arcuate axial center is continuously arcuate from one end of the elbow to the other, while the wall portion of the elbow lying radially inward of its arcuate center and between the small end 13 and the mid-point 12 of the elbow is semi-frusto-conical with its large end adjacent to the mid-point 12 and consequently spaced from the large end of the elbow and its other end closely adjacent to but spaced slightly from the small diameter end 13 of the elbow. As a result the inner "curve" 19 of the tapered one-half 16 of the elbow is a substantially straight line extending tangentially from the inner curve 17 of the untapered portion 15 and merging into a rather abrupt curve 20 a small distance inwardly from the small diameter end 13 of the elbow. The outer curve of the tapered portion has a somewhat greater radius than that of the untapered portion, is eccentric thereto and merges into it at the medial point 12 at which the two portions of the elbow may be said to be joined.

From the foregoing description, taken together with the accompanying drawing, it will be readily apparent that this invention provides a 90° reducing elbow which may be readily cut to provide an elbow of a different angle from that of the original, which angle may lie anywhere between 45° and 90°, and the resultant elbow will have the same end diameters as the original so that it will be capable of being butt welded to the same size pipes or tubes as the original. Both ends of the elbow may be chamfered at the time the elbow is made, or since the large diameter end may be cut off to reduce the angle of the elbow, chamfering of it may be deferred until this fact is determined.

What I claim as my invention is:

A 90° reducing elbow comprising: a curved pipe segment the ends of which lie in planes substantially at right angles to one another and have different cross sectional diameters, said elbow having a substantially arcuate axial centerline whose center of curvature lies substantially in both of said planes, the contour of that portion of the elbow which lies radially outward of its centerline being continuously arcuate from one end of the elbow to the other, one end portion of the elbow comprising substantially 45° of its length containing substantially the entire reduction of the elbow, which reduction extends throughout substantially the whole of said 45° length, while that wall portion of said 45° length which lies radially inward of the centerline of the elbow has a substantially semi-frusto-conical shape throughout substantially the whole of said 45° length with the small end of said semi-frusto-conical wall portion closely adjacent to the small diameter end of the elbow, and that portion of the elbow lying between the large end of the semi-frusto-conical wall portion and the large diameter end of the elbow being of uniform cross-section equal to the diameter of the large end of the elbow and being concentric with the arcuate axial centerline of the elbow.

GILBERT A. GAUM.

References Cited in the file of this patent

UNITED STATES PATENTS

| Number | Name | Date |
|---|---|---|
| 1,793,681 | Crowell | Feb. 24, 1931 |

FOREIGN PATENTS

| Number | Country | Date |
|---|---|---|
| 10,085 | Great Britain | May 3, 1898 |
| 583,550 | Germany | Sept. 5, 1933 |